(12) United States Patent
Wilson et al.

(10) Patent No.: US 11,429,941 B2
(45) Date of Patent: Aug. 30, 2022

(54) AUTOMATED TELLER MACHINE SERVICE TRACKING

(71) Applicant: Bank of America Corporation, Charlotte, NC (US)

(72) Inventors: Douglas Scott Wilson, Nashua, NH (US); Gary L. Best, Jr., Acwroth, GA (US)

(73) Assignee: Bank of America Corporation, Charlotte, NC (US)

( * ) Notice: Subject to any disclaimer, the term of this patent is extended or adjusted under 35 U.S.C. 154(b) by 211 days.

(21) Appl. No.: 16/918,379

(22) Filed: Jul. 1, 2020

(65) Prior Publication Data

US 2022/0005006 A1 Jan. 6, 2022

(51) Int. Cl.
*G06Q 20/10* (2012.01)
*G06K 19/06* (2006.01)

(52) U.S. Cl.
CPC ... *G06Q 20/1085* (2013.01); *G06K 19/06037* (2013.01)

(58) Field of Classification Search
None
See application file for complete search history.

(56) References Cited

U.S. PATENT DOCUMENTS

| | | | |
|---|---|---|---|
| 5,253,167 A | 10/1993 | Yoshida et al. | |
| 5,861,614 A | 1/1999 | Gardner | |
| 5,884,073 A | 3/1999 | Dent | |
| 5,984,178 A | 11/1999 | Gill et al. | |
| 6,279,826 B1 | 8/2001 | Gill et al. | |
| 6,378,770 B1 | 4/2002 | Clark et al. | |
| 6,470,288 B1 | 10/2002 | Keidel et al. | |
| 6,789,730 B1 | 9/2004 | Trelawney et al. | |
| 6,953,150 B2 | 10/2005 | Shepley et al. | |
| 6,964,368 B1 | 11/2005 | Trelawney et al. | |
| 7,093,749 B1 | 8/2006 | Block et al. | |

(Continued)

FOREIGN PATENT DOCUMENTS

| | | |
|---|---|---|
| EP | 1898374 A1 | 3/2008 |
| WO | 2004061739 A1 | 7/2004 |

OTHER PUBLICATIONS

"Bitcoin ATMs: A beginner's guide to Bitcoin Teller Machines, 2013, https://cointelegraph.com" (Year: 2013).*

*Primary Examiner* — Kito R Robinson
*Assistant Examiner* — Toan Duc Bui (57) ABSTRACT

A device configured to send a service request identifier, an automated teller machine (ATM) identifier, and service information to a user device that is associated with a service provider. The device is further configured to receive service equipment information that includes a service equipment identifier for service equipment for servicing the ATM. The device is further configured to receive the service request identifier, a scanned ATM identifier, and a scanned service equipment identifier from the user device. The device is further configured to send an authorization to the service provider to perform a service on the ATM in response to determining that the scanned ATM identifier matches the ATM identifier that is associated with the service request identifier and determining that the scanned service equipment identifier matches the service equipment identifier that is associated with the ATM identifier.

20 Claims, 3 Drawing Sheets

(56) References Cited

U.S. PATENT DOCUMENTS

| | | |
|---|---|---|
| 7,093,750 B1 | 8/2006 | Block et al. |
| 7,163,144 B1 | 1/2007 | Trelawney et al. |
| 7,230,223 B2 | 6/2007 | Jespersen et al. |
| 7,289,974 B2 | 10/2007 | Godeby et al. |
| 7,494,047 B2 | 2/2009 | Shepley et al. |
| 7,520,423 B2 | 4/2009 | Peters et al. |
| 7,617,971 B2 | 11/2009 | Shepley et al. |
| 7,661,583 B2 | 2/2010 | Schlabach et al. |
| 7,922,078 B1 | 4/2011 | Putman et al. |
| 8,078,518 B2 | 12/2011 | Goertz et al. |
| 8,100,323 B1 | 1/2012 | Crews et al. |
| 8,108,726 B2 | 1/2012 | McGraw, IV et al. |
| 8,161,330 B1 | 4/2012 | Vannatter et al. |
| 8,423,465 B1 | 4/2013 | McGraw, IV et al. |
| 8,495,424 B1 | 7/2013 | Vannatter et al. |
| 8,593,971 B1 | 11/2013 | Bryant et al. |
| 8,630,950 B2 | 1/2014 | Saegert et al. |
| 8,794,513 B2 | 8/2014 | Wayne et al. |
| 8,868,971 B2 | 10/2014 | Zimmerman |
| 8,924,266 B2 | 12/2014 | Shirbabadi et al. |
| 9,003,514 B1 * | 4/2015 | Nuthi ...................... G06F 21/35 725/39 |
| 9,552,246 B2 | 1/2017 | Horgan |
| 10,290,052 B1 | 5/2019 | Quesenberry et al. |
| 10,353,689 B2 | 7/2019 | Mishra et al. |
| 10,395,199 B1 | 8/2019 | Gibson et al. |
| 10,764,294 B1 * | 9/2020 | Wasiq ...................... H04L 63/10 |
| 11,276,050 B1 * | 3/2022 | Lightowler ............ G06T 19/006 |
| 2004/0149818 A1 | 8/2004 | Shepley et al. |
| 2004/0153409 A1 | 8/2004 | Shepley et al. |
| 2004/0215566 A1 | 10/2004 | Meurer |
| 2007/0000993 A1 * | 1/2007 | Graef ...................... B65H 31/06 235/379 |
| 2007/0131757 A1 | 6/2007 | Hamilton et al. |
| 2008/0110974 A1 | 5/2008 | Shepley et al. |
| 2010/0042541 A1 | 2/2010 | Kang et al. |
| 2011/0191243 A1 | 8/2011 | Allen |
| 2012/0223134 A1 * | 9/2012 | Smith ................ G06Q 20/4016 235/379 |
| 2014/0107836 A1 | 4/2014 | Crews et al. |
| 2015/0363755 A1 | 12/2015 | Walden et al. |
| 2015/0379489 A1 | 12/2015 | Gopalakrishnan et al. |
| 2017/0178041 A1 * | 6/2017 | Li ........................... H04L 67/10 |
| 2017/0221295 A1 | 8/2017 | Pont et al. |
| 2020/0090166 A1 * | 3/2020 | Tonini ................. G06Q 20/385 |
| 2021/0357897 A1 * | 11/2021 | Phillips ............. G06Q 30/0613 |
| 2022/0027865 A1 * | 1/2022 | DuPont ................ G06Q 20/381 |

* cited by examiner

AUTOMATED TELLER MACHINE SERVICE TRACKING

TECHNICAL FIELD

The present disclosure relates generally to automated teller machines, and more specifically to automated teller machine service tracking.

BACKGROUND

Existing computer systems lack the ability to provide tracking and quality control for the servicing of resources such as automated teller machines (ATMs). ATMs are continuously serviced and maintained in order to meet the demands of a consumer. Issues that are associated with an ATM may be unique to the configuration of the ATM and they may arise due to any number of variables. This means that each issue requires a sufficient amount of time to troubleshoot and resolve. When an ATM becomes inoperable, for example, due to repairs or when it becomes empty, the ATM is no longer able to provide services to a consumer. This means that a consumer will have to use other ATMs which causes an imbalance that can quickly deplete the resources of other ATMs and increase the wear and tear on other ATMs. Existing computer systems are unable to determine whether an ATM has been recently service or whether the ATM has been serviced correctly. This lack of insight also means that existing computer systems are unable to prevent issues and downtime that are caused by a lack of servicing or improper servicing.

SUMMARY

The system disclosed in the present application provides a technical solution to the technical problems discussed above by monitoring and authorizing automated teller machine (ATM) servicing. An ATM needs monitoring and servicing to prevent the ATM from experiencing downtime which can negatively impact other ATMs by depleting their resources and increasing their wear and tear. The disclosed system provides several practical applications and technical advantages which include a process to track the servicing of ATMs and to provide quality control for their servicing. This process includes a pre-staging phase where a service tracking device collects information about a requested service and information from a service provider about the equipment that will be used to service an ATM. After the pre-staging phase, the service tracking device is configured to communicate with the service provider using a service tracking application that is installed on their user device. The service tracking application allows the service provider to send information from the worksite to the service tracking device. This process allows the service tracking device to confirm that the correct ATM and the correct service equipment are being used to service the ATM before authorizing the service of the ATM. In addition, this process also allows the service tracking device to track when a service has been completed. This allows the system to more accurately track the current state of ATMs which also allows the system to prevent any issues or downtime on the ATMs.

In one embodiment, the system comprises a service tracking device that is configured to receive a service request for servicing an ATM. The service request includes an ATM identifier that uniquely identifies an ATM and service information that identifies a service to perform on the ATM. The service tracking device sends service request information to a service tracking application that is installed on a user device that is associated with a service provider. The service request information includes a service request identifier that is associated with the service request, the ATM identifier, and the service information. The service tracking device receives service equipment information from the service tracking application in response to sending the service request information. The service equipment information includes a service equipment identifier that uniquely identifies the service equipment that is associated with performing a service on the ATM. The service tracking device then stores an association between the service request information and the service equipment information.

At a later time, the service provider may arrive at the location of a requested service. Before the service provider can complete any services, the service provider will use the service tracking application to request authorization from the service tracking device. The service tracking device receives the service request identifier, a scanned ATM identifier, and a scanned service equipment identifier from the service tracking application. The service tracking device identifies the ATM identifier and the service equipment identifier that are associated with the service request identifier. The service tracking device may then determine that the scanned ATM identifier matches the ATM identifier that is associated with the service request identifier and determine that the scanned service equipment identifier matches the service equipment identifier that is associated with the ATM identifier. The service tracking device sends an authorization to the service provider to perform a service on the ATM in response to the determinations.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
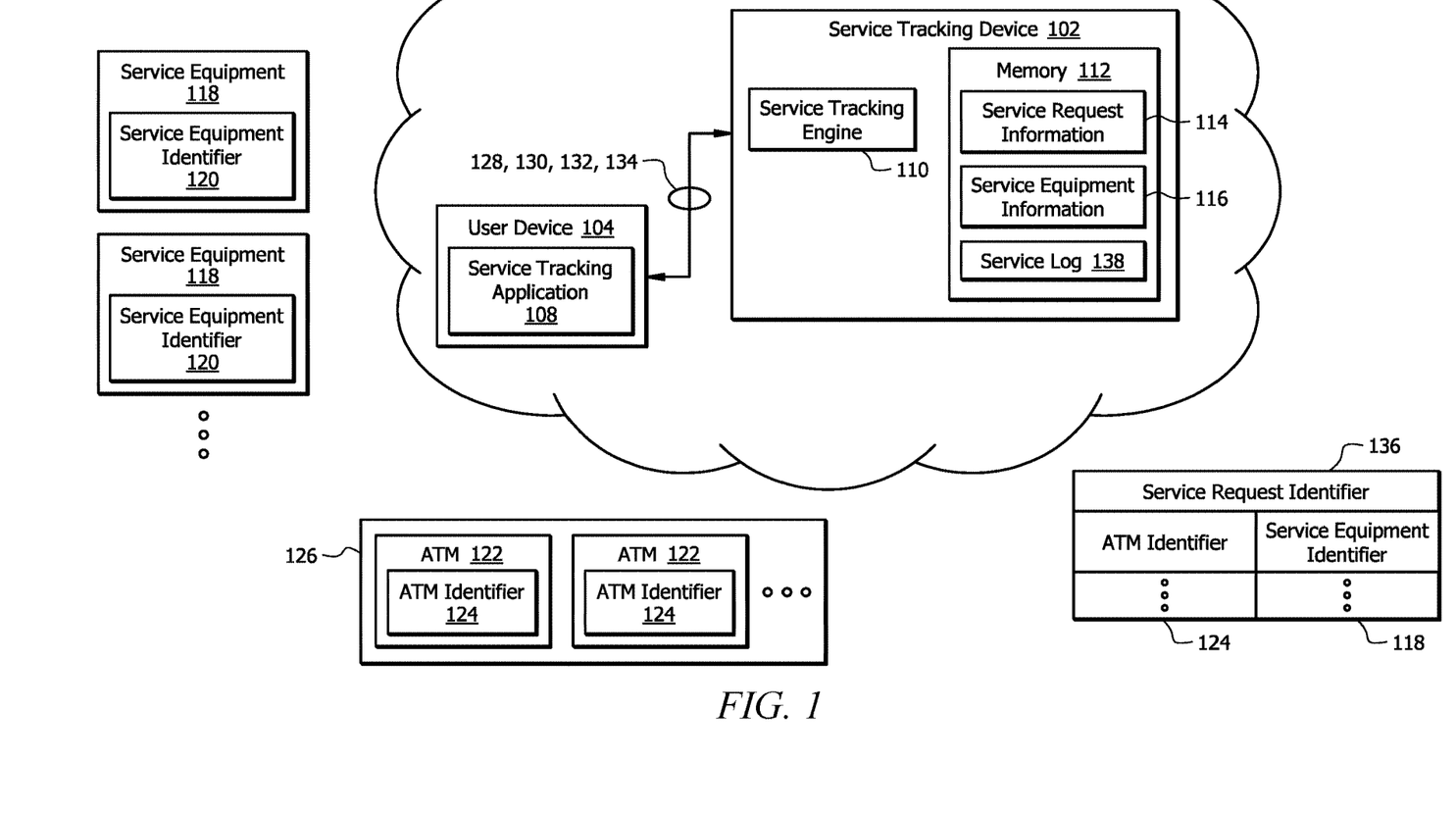
FIG. 1 is a schematic diagram of an automated teller machine (ATM) service tracking system.

FIG. 1 is a schematic diagram of an automated teller machine (ATM) service tracking system 100. In one embodiment, the system 100 comprises a service tracking device 102 that is in signal communication with a service tracking application 108 that is installed on a user device 104. The service tracking device 102 and the user device 104 are in signal communication with each other over a network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

In one embodiment, the service tracking device 102 is configured to send service request information 128 to the user device 104 via the service tracking application 108. The service tracking application 108 is configured to operate as a client for the service tracking device 102 that allows the service provider to provide information to the service tracking device 102. The user device 104 is associated with a service provider. Examples of service providers include, but are not limited to, an armored transport service, a repair service, and a maintenance service. Examples of user devices 104 include, but are not limited to, smartphones, tablets, laptops, or any other suitable type of computing device. The service request information 128 comprises an ATM identifier 124 that uniquely identifies an ATM 122 at a location 126 as well as instructions for performing a particular type of service on the ATM 122. Examples of an ATM identifier 124 include, but are not limited to, a barcode, a two-dimensional barcode (e.g. a Quick Response (QR) code), an alphanumeric identifier, or any other suitable type of identifier.

In response to receiving the service request information 128, the service provider can use the service tracking application 108 to provide service equipment information 130 that is associated with the service equipment 118 or tools that will be used to perform the requested service. For example, the service request information 128 may provide instructions for transporting a currency to or from the ATM 122. In this example, the service equipment information 130 may comprise a service equipment identifier 120 that identifies a container that will be used to transport the currency. Examples of a service equipment identifier 120 include, but are not limited to, a barcode, a two-dimensional barcode (e.g. a Quick Response (QR) code), an alphanumeric identifier, or any other suitable type of identifier. In other examples, the service equipment identifier 120 may be associated with any other suitable type of service equipment 118. Examples of other types of service equipment 118 include, but are not limited to, replacement parts, calibration tools, diagnostic tools, repair tools, or any other suitable type of equipment.

In response to receiving the service equipment information 130, the service tracking device 102 is configured to associate the service request information 128 with the received service equipment information 130. This process allows the service tracking device 102 to confirm that the correct ATM 122 and the correct service equipment 118 are being used to service the ATM 122 before authorizing the service of the ATM 122. In addition, this process also allows the service tracking device 102 to track when a service has been completed. This allows the system 100 to more accurately track the current state of ATMs 122 that are associated with an enterprise.

Service Tracking Device

The service tracking device 102 is generally configured to manage, facilitate, and authorize the servicing of ATMs 122 that are associated with an enterprise. The service tracking device 102 comprises a service tracking engine 110 and a memory 112. The service tracking device 102 may be configured as shown or in any other suitable configuration. Additional information about the hardware configuration of the service tracking device 102 is described in FIG. 3.

The service tracking engine 110 is generally configured to communicate with the service tracking application 108 to provide service request information 128 to a service provider and to receive service equipment information 130 from the service provider that is associated with a requested service. The service tracking engine 110 is further configured to store an association between the service request information 128 and the service equipment information 130. The service tracking engine 110 is further configured to use this information at a later time to confirm that the correct ATM 122 and the correct service equipment 118 are being used to service the ATM 122 before authorizing the service of the ATM 122. An example of the service tracking engine 110 in operation is described in FIG. 2. The memory 112 is configured to store service request information 114, service equipment information 116, a service log 138, and/or any other suitable type of data.

ATM Service Tracking Process

Figure 2:
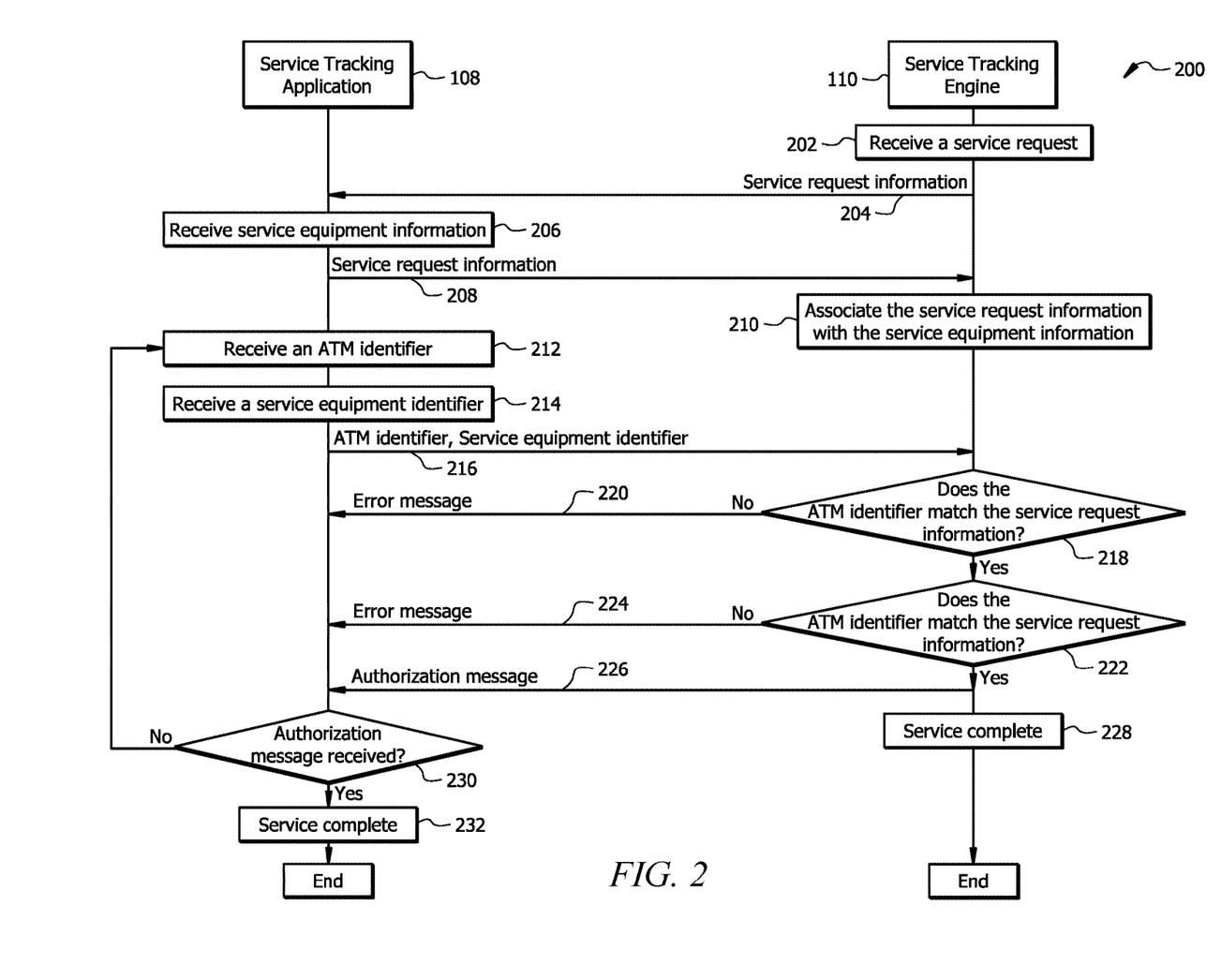
FIG. 2 is a protocol diagram of an embodiment of an ATM service tracking method.

FIG. 2 is a protocol diagram of an embodiment of an ATM service tracking method 200. The service tracking device 102 may employ method 200 to facilitate and authorize the servicing of ATMs 122. This process allows the service tracking device 102 to confirm that the correct ATM 122 and the correct service equipment 118 are being used to service an ATM 122 before authorizing the service of the ATM 122. In addition, this process also allows the service tracking device 102 to track when a service has been completed. This allows the system 100 to more accurately track the current state of ATMs 122.

Pre-Staging a Service

At step 202, the service tracking engine 110 receives a service request. As an example, the service request may be sent by an enterprise to request armored transportation services to deposit a currency into one or more ATMs 122. In this example, the service request may comprise location information that identifies the physical location 126 (e.g. address) of the one or more ATMs 122. The service request may further comprise ATM identifiers 124 that uniquely identify the one or more ATMs 122. For example, the service request may comprise QR codes for each of the ATMs 122 that are to be serviced. The service request may further comprise service information that identifies a service to perform on each of the one or more ATMs 122. In this example, the service information indicates a request for armored transportation services to deposit a currency into the one or more ATMs 122. In other examples, the service request may further comprise any other suitable type of information that is associated with servicing an ATM 122.

At step 204, the service tracking engine 110 sends service request information 128 to the service tracking application 108. Here, the service tracking engine 110 extracts at least a portion of the information from the service request to provide details to the service provider about the requested service. The service tracking engine 110 sends the service request information 128 via the service tracking application 108. As an example, the service tracking engine 110 may send service request information 128 that comprises a service request identifier 136 that is associated with the service request, the location information, the ATM identifiers 124, and the service information. The service request identifier 136 may be any suitable type of identifier that uniquely identifies the service request. The service information comprises instructions about the service to be performed. For example, the service information may indicate that a currency deposit is requested and may identify a denomination breakdown for the deposit. As another example, the service information may identify parts to replace or a maintenance service for an ATM 122. In other examples, the service tracking engine 110 may send any other suitable type or combination of information from the service request to the service tracking application 108.

The service tracking application 108 provides a graphical user interface which allows the service provider to view the information that is associated with the service request. Once the service provider receives the service request information 128, the service provider may begin provisioning service equipment 118 for servicing the one or more ATMs 122. Continuing with our previous example, the service request may request armored transportation services to deposit a currency into the one or more ATMs 122. In this example, the service provider may assign containers (e.g. lock bags or boxes) for transporting the currency to the one or more ATMs 122. Each container comprises a service equipment identifier 120 that uniquely identifies the container. Once the service provider assigns a container to an ATM 122, the service provider may begin filling the container with the requested amount of currency for the ATM 122. In other examples, the service provider may allocate other types of service equipment 118 for servicing an ATM 122. For instance, the service provider may assign an empty container to an ATM 122 when the service request indicates a withdrawal from the ATM 122. As another example, the service provider may assign a replacement part to an ATM 122 when the service request indicates repairing an ATM 122.

At step 206, the service tracking application 108 receives service equipment information 130. In one embodiment, the service provider may provide service equipment information 130 by scanning or entering a service equipment identifier 120 into the service tracking application 108. For example, the service tracking application 108 may identify an ATM 122 to be serviced and the service provider may use a camera on the user device 104 to capture an image of the service equipment identifier 120 (e.g. a QR code) that is associated with the service equipment 118 that will be used to service the ATM 122. The service provider may repeat this process for all of the ATMs 122 in the service request. After all the ATMs 122 have been assigned to service equipment 118, the service tracking application 108 may send the service equipment information 130 to the service tracking device 102.

At step 208, the service tracking application 108 sends the service equipment information 130 to the service tracking engine 110. The service equipment information 130 comprises service equipment identifiers 120 that are associated with the assigned service equipment 118 for servicing the one or more ATMs 122. The service equipment information 130 may further comprise any other suitable type of information that is associated with the service provider and/or the service equipment 118 that will be used to service an ATM 122.

At step 210, the service tracking engine 110 associates the service request information 128 with the service equipment information 130. After the service tracking engine 110 receives the service equipment information 130, the service tracking engine 110 stores an association between the service equipment information 130 and the service request information 128. For example, the service tracking engine 110 may store an association between the service request identifier 136, an ATM identifier 124 for an ATM 122, and a service equipment identifier 120 that corresponds with the service equipment 118 that will be used to service the ATM 122. The service tracking engine 110 may repeat this process for all of the ATMs 122 in the service request. This process will allow the service tracking device 102 to confirm that the correct ATM 122 and the correct service equipment 118 are being used to service the ATM 122 before authorizing the service of the ATM 122.

Authorizing a Service

At a later time, the service provider may arrive at the location 126 of a requested service. Before the service provider can complete any services, the service provider will use the service tracking application 108 to request authorization from the service tracking device 102. This process allows the service tracking device 102 to provide quality control to ensure that a service is accurately completed. This process also allows the service tracking device 102 to track when a service has been completed. This allows the system 100 to more accurately track the current state of ATMs 122.

At step 212, the service tracking application 108 receives an ATM identifier 124. Before performing a service on an ATM 122, the service provider may scan or enter an ATM identifier 124 into the service tracking application 108. For example, the service provider may use a camera on the user device 104 to capture an image of an ATM identifier 124 (e.g. a QR code) for the ATM 122 to be serviced.

At step 214, the service tracking application 108 receives a service equipment identifier 120. The service provider may scan or enter a service equipment identifier 120 into the service tracking application 108. For example, the service provider may use the camera on the user device 104 to capture an image of a service equipment identifier 120 (e.g. a QR code) for the service equipment 118 that will be used to service the ATM 122 that is associated with the ATM identifier 124.

At step 216, the service tracking application 108 sends the ATM identifier 124 and the service equipment identifier 120 to the service tracking engine 110. Here, the service tracking application 108 sends the service request identifier 136, the ATM identifier 124, and the service equipment identifier 120 to the service tracking engine 110 to seek an authorization to perform the requested service on the ATM 122. In one embodiment, the service tracking application 108 may also send location information to the service tracking engine 110. For example, the service tracking application 108 may use a Global Positioning System (GPS) sensor on the user device 104 to obtain location information about where the user device 104 is located to perform the requested service. The location information may comprise GPS coordinates, a physical address, or any other suitable type of identifier that identifies the location of where the user device 104 is located.

In one embodiment, the service tracking engine 110 compares the received location information to the location information that is associated with the service request identifier 136 to determine whether the service provider is at the correct location. In this case, the service tracking engine 110 may only authorize a service to be performed when the received location information matches the location information that is associated with the service request identifier 136.

At step 218, the service tracking engine 110 determines whether the scanned ATM identifier 124 matches the service request information 128. For example, the service tracking engine 110 may use the service request identifier 136 as a search token to look-up ATM identifiers 124 that are associated with the service request identifier 136. The service tracking engine 110 may then compare the received scanned ATM identifier 124 to the ATM identifiers 124 that are associated with the service request identifier 136.

The service tracking engine 110 proceeds to step 220 in response to determining that the ATM identifier 124 does not match an ATM identifier 124 that is associated with the service request identifier 136. In this case, the service tracking engine 110 determines that an error has occurred. For example, the service provider may have scanned an ATM 122 that is not associated with request service. At step 220, the service tracing device sends an error message 132 to the service tracking application 108. The error message 132 indicates that an error has occurred and that the service provider is not authorized to perform a service on the identified ATM 122. In some embodiments, the error message 132 may provide details about the type of error that occurred and/or how to remedy the error. For example, the error message 132 may indicate that the wrong ATM 122 has been scanned and provide instructions for the service provider to scan another ATM 122. In this example, the error message 132 may comprise additional details for identifying or locating the correct ATM 122. For instance, the error message 132 may comprise a physical description of the ATM 122 and/or a physical description of where the ATM 122 is located within a location 126. The error message 132 may be sent as an application notification or any other suitable type of message.

Returning to step 218, the service tracking engine 110 proceeds to step 222 in response to determining that the ATM identifier 124 matches the service request information 128. In this case, the service tracking engine 110 determines that the service provider has correctly identified an ATM 122 that is associated with the service request. At step 222, the service tracking engine 110 determines whether the scanned service equipment identifier 120 matches the service equipment identifier 120 that is associated with the identified ATM 122. For example, the service tracking engine 110 compares the scanned service equipment identifier 120 to the service equipment identifier 120 that is associated with the ATM identifier 124.

The service tracking engine 110 proceeds to step 224 in response to determining that the service equipment identifier 120 does not match the service equipment identifier 120 that is associated with the ATM identifier 124. In this case, the service tracking engine 110 determines that an error has occurred. For example, the service provider may have scanned the wrong service equipment 118 for servicing the identified ATM 122. At step 224, the service tracking engine 110 sends an error message 132 to the service tracking application 108. The error message 132 indicates that an error has occurred and that the service provider is not authorized to perform a service on the identified ATM 122. In some embodiments, the error message 132 may provide details about the type of error that occurred and/or how to remedy the error. For example, the error message 132 may indicate that the wrong service equipment 118 has been scanned and provide instructions for the service provider to scan another piece of service equipment 118. In this example, the error message 132 may comprise additional details for identifying the correct service equipment 118. For instance, the error message 132 may comprise a physical description of the service equipment 118.

Returning to step 222, the service tracking engine 110 proceeds to step 226 in response to determining that the service equipment identifier 120 matches the service equipment information 130. In this case, the service tracking engine 110 determines that the service provider has correctly identified the service equipment 118 that is associated with the identified ATM 122. At step 226, the service tracking engine 110 sends an authorization message 134 to the service tracking application 108. The authorization message 134 indicates that the service provider is approved and authorized to perform the requested service on the ATM 122. The authorization message 134 may be sent as an application notification or any other suitable type of message.

At step 228, the service tracking engine 110 determines that the ATM service has been completed. In one embodiment, the service tracking engine 110 is configured to update a service log 138 to indicate that the service on the ATM 122 has been completed after authorizing the service provider to perform the service on the ATM 122. For example, the service tracking engine 110 may create a new entry in the service log 138 that includes a timestamp for when a service was completed. This process allows the service tracking engine 110 to more accurately track the current state of ATMs 122 that are scheduled to be serviced. In some embodiments, the service tracking engine 110 may be configured to authorize a payment to the service provider after authorizing the service provider to perform the service on the ATM 122. This process allows the service tracking device 102 to reduce the amount of time required to pay for services that are provided by the service provider.

At step 230, the service tracking application 108 determines whether an authorization message 134 has been received from the service tracking engine 110. The service tracking application 108 returns to step 212 in response to determining that an error message 132 has been received from the service tracking engine 110. In this case, the service tracking application 108 returns to step 212 to allow the service provider to rescan an ATM identifier 124 and/or a service equipment identifier 120.

The service tracking application 108 proceeds to step 232 in response to determining that an authorization message 134 has been received from the service tracking engine 110. In this case, the service tracking application 108 determines that the service provider is authorized to service the identified ATM 122 using the identified service equipment 118.

After receiving the authorization message 134, the service provider may complete the requested service. Continuing with our previous currency deposit example, the service provider may deposit a currency from a container that is associated with the service equipment identifier 120 into the identified ATM 122. As another example, the service provider may remove a currency from the ATM 122 and place the currency into a container that is associated with the service equipment identifier 120. As another example, the service provider may install a part that is associated with the service equipment identifier 120 into the identified ATM 122. In other examples, the service provider may perform any other suitable type of service on the identified ATM 122.

At step 232, the service tracking application 108 determines that the ATM service is complete. The service provider may repeat the process described in steps 212-232 for any servicing any other ATMs 122 that are identified in the service request information 128. For example, a location 126 may have multiple ATMs 122 that are scheduled to be serviced. In this case, the service provider will repeat the process of scanning an ATM identifier 124 and a corresponding service equipment identifier 120 to seek authorization for servicing the ATM 122.

ATM Service Tracking Device Hardware Configuration

Figure 3:
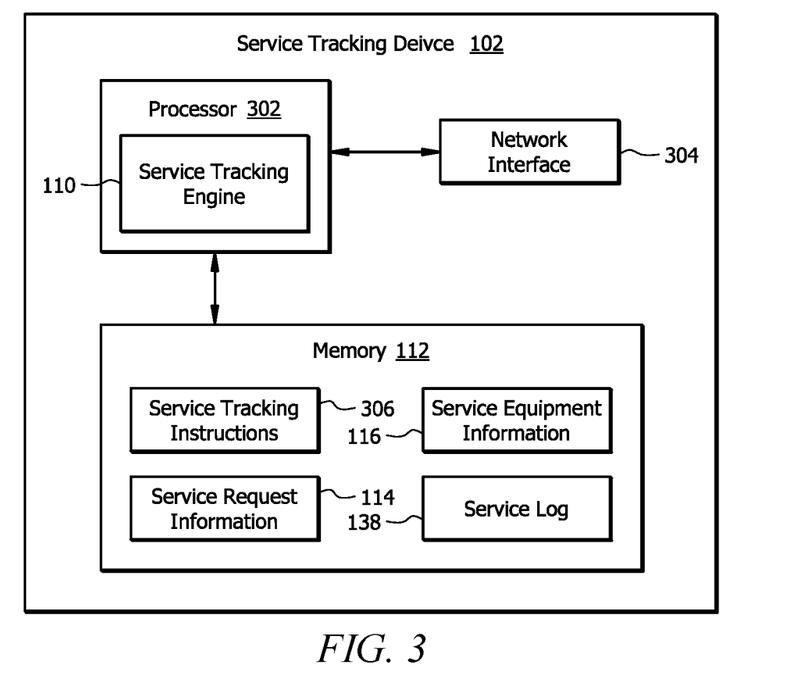
FIG. 3 is a schematic diagram of an embodiment of a device configured to track ATM servicing.

FIG. 3 is a schematic diagram of an embodiment of a device (e.g. service tracking device 102) configured to track the servicing of ATMs 122. The service tracking device 102 comprises a processor 302, a memory 112, and a network interface 304. The service tracking device 102 may be configured as shown or in any other suitable configuration.

The processor 302 comprises one or more processors operably coupled to the memory 112. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 112. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute service tracking instructions 306 to implement the service tracking engine 110. In this way, processor 302 may be a special-purpose computer designed to implement the functions disclosed herein. In an embodiment, the service tracking engine 110 is implemented using logic units, FPGAs, ASICs, DSPs, or any other suitable hardware. The service tracking engine 110 is configured to operate as described in FIGS. 1 and 2. For example, the service tracking engine 110 may be configured to perform the steps of method 200 as described in FIG. 2.

The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store service tracking instructions 306, service request information 114, service equipment information 116, a service log 138, and/or any other data or instructions. The service tracking instructions 306 may comprise any suitable set of instructions, logic, rules, or code operable to execute the service tracking engine 110. The service request information 114, the service equipment information 116, and the service log 138 are configured similar to service request information 114, the service equipment information 116, and the service log 138 described in FIGS. 1 and 2, respectively.

The network interface 304 is configured to enable wired and/or wireless communications. The network interface 304 is configured to communicate data between the service tracking device 102 and other devices (e.g. user devices 104), systems, or domain. For example, the network interface 304 may comprise a WIFI interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An automated teller machine (ATM) service tracking device, comprising:
   a network interface configured to communicate with a user device that is associated with a service provider; and
   a processor operably coupled to the network interface, configured to:
      receive a service request, wherein the service request comprises:
         an ATM identifier that uniquely identifies an ATM;
         location information that identifies a physical location of the ATM; and
         service information that identifies a service to perform on the ATM;
      send service request information to the user device, wherein the service request information comprises:
         a service request identifier that is associated with the service request;
         the ATM identifier;
         the location information that identifies the physical location of the ATM; and
         the service information;
      receive service equipment information in response to sending the service request information, wherein the service equipment information comprises a service equipment identifier that uniquely identifies service equipment that is associated with performing a service on the ATM;
      store an association between the service request information and the service equipment information;
      receive the service request identifier, a scanned ATM identifier, a scanned service equipment identifier, and a location of the user device from the user device;
      compare the location information that identifies the physical location of the ATM to the location of the user device; and
      in response to determining that the location information that identifies the physical location of the ATM matches the location of the user device:

identify the ATM identifier and the service equipment identifier that are associated with the service request identifier;
determine the scanned ATM identifier matches the ATM identifier that is associated with the service request identifier;
determine the scanned service equipment identifier matches the service equipment identifier that is associated with the ATM identifier; and
send an authorization to the service provider to perform a service on the ATM in response to determining that the scanned ATM identifier matches the ATM identifier that is associated with the service request identifier and determining that the scanned service equipment identifier matches the service equipment identifier that is associated with the ATM identifier.

2. The device of claim 1, wherein determining that the scanned service equipment identifier matches the service equipment identifier that is associated with the ATM identifier comprises using the service request identifier as a search token to look up the ATM identifier that is associated with the service request identifier.

3. The device of claim 1, wherein:
the service information comprises instructions for depositing a currency amount into the ATM; and
the service equipment identifier is associated with a container for transporting the currency amount to the ATM.

4. The device of claim 1, wherein:
the service information comprises instructions for removing a currency from the ATM; and
the service equipment identifier is associated with a container for transporting the removed currency from the ATM.

5. The device of claim 1, wherein the processor is further configured to update a service log to indicate that the service on the ATM has been completed after authorizing the service provider to perform the service on the ATM.

6. The device of claim 1, wherein the processor is further configured to authorize a payment to the service provider after authorizing the service provider to perform the service on the ATM.

7. The device of claim 1, wherein:
the ATM identifier is a two-dimensional barcode; and
the equipment identifier is a two-dimensional barcode.

8. An automated teller machine (ATM) service tracking method, comprising:
receiving a service request, wherein the service request comprises:
an ATM identifier that uniquely identifies an ATM;
location information that identifies a physical location of the ATM; and
service information that identifies a service to perform on the ATM;
sending service request information to a user device that is associated with a service provider, wherein the service request information comprises:
a service request identifier that is associated with the service request;
the ATM identifier;
the location information that identifies the physical location of the ATM; and
the service information;
receiving service equipment information in response to sending the service request information, wherein the service equipment information comprises a service equipment identifier that uniquely identifies service equipment that is associated with performing a service on the ATM;
storing an association between the service request information and the service equipment information;
receiving the service request identifier, a scanned ATM identifier, a scanned service equipment identifier, and a location of the user device from the user device;
comparing the location information that identifies the physical location of the ATM to the location of the user device; and
in response to determining that the location information that identifies the physical location of the ATM matches the location of the user device:
identifying the ATM identifier and the service equipment identifier that are associated with the service request identifier;
determining the scanned ATM identifier matches the ATM identifier that is associated with the service request identifier;
determining the scanned service equipment identifier matches the service equipment identifier that is associated with the ATM identifier; and
sending an authorization to the service provider to perform a service on the ATM in response to determining that the scanned ATM identifier matches the ATM identifier that is associated with the service request identifier and determining that the scanned service equipment identifier matches the service equipment identifier that is associated with the ATM identifier.

9. The method of claim 8, wherein determining that the scanned service equipment identifier matches the service equipment identifier that is associated with the ATM identifier comprises using the service request identifier as a search token to look up the ATM identifier that is associated with the service request identifier.

10. The method of claim 8, wherein:
the service information comprises instructions for depositing a currency amount into the ATM; and
the service equipment identifier is associated with a container for transporting the currency amount to the ATM.

11. The method of claim 8, wherein:
the service information comprises instructions for removing a currency from the ATM; and
the service equipment identifier is associated with a container for transporting the removed currency from the ATM.

12. The method of claim 8, further comprising updating a service log to indicate that the service on the ATM has been completed after authorizing the service provider to perform the service on the ATM.

13. The method of claim 8, further comprising authorizing a payment to the service provider after authorizing the service provider to perform the service on the ATM.

14. The method of claim 8, wherein:
the ATM identifier is a two-dimensional barcode; and
the equipment identifier is a two-dimensional barcode.

15. A computer program comprising executable instructions stored in a non-transitory computer readable medium that when executed by a processor causes the processor to:
receive a service request, wherein the service request comprises:
an ATM identifier that uniquely identifies an ATM;
location information that identifies a physical location of the ATM; and service information that identifies a service to perform on the ATM;
send service request information to a user device that is associated with a service provider, wherein the service request information comprises:
  a service request identifier that is associated with the service request;
  the ATM identifier;
  the location information that identifies the physical location of the ATM; and
  the service information;
receive service equipment information in response to sending the service request information, wherein the service equipment information comprises a service equipment identifier that uniquely identifies service equipment that is associated with performing a service on the ATM;
store an association between the service request information and the service equipment information;
receive the service request identifier, a scanned ATM identifier, a scanned service equipment identifier, and a location of the user device from the user device;
compare the location information that identifies the physical location of the ATM to the location of the user device; and
in response to determining that the location information that identifies the physical location of the ATM matches the location of the user device:
  identify the ATM identifier and the service equipment identifier that are associated with the service request identifier;
  determine the scanned ATM identifier matches the ATM identifier that is associated with the service request identifier;
  determine the scanned service equipment identifier matches the service equipment identifier that is associated with the ATM identifier; and
  send an authorization to the service provider to perform a service on the ATM in response to determining that the scanned ATM identifier matches the ATM identifier that is associated with the service request identifier and determining that the scanned service equipment identifier matches the service equipment identifier that is associated with the ATM identifier.

16. The computer program of claim 15, wherein determining that the scanned service equipment identifier matches the service equipment identifier that is associated with the ATM identifier comprises using the service request identifier as a search token to look up the ATM identifier that is associated with the service request identifier.

17. The computer program of claim 15, wherein:
the service information comprises instructions for depositing a currency amount into the ATM; and
the service equipment identifier is associated with a container for transporting the currency amount to the ATM.

18. The computer program of claim 15, wherein:
the service information comprises instructions for removing a currency from the ATM; and
the service equipment identifier is associated with a container for transporting the removed currency from the ATM.

19. The computer program of claim 15, further comprising instructions that when executed by the processor causes the processor to update a service log to indicate that the service on the ATM has been completed after authorizing the service provider to perform the service on the ATM.

20. The computer program of claim 15, further comprising instructions that when executed by the processor causes the processor to authorize a payment to the service provider after authorizing the service provider to perform the service on the ATM.

* * * * *